United States Patent
Fukuda

(10) Patent No.: US 7,428,021 B2
(45) Date of Patent: Sep. 23, 2008

(54) IMAGE PROCESSING METHOD, RECORDING MEDIUM AND APPARATUS FOR PERFORMING COLOR ADJUSTMENT TO IMAGE DATA USING A BRIGHTNESS COMPONENT, A LOW-FREQUENCY BRIGHTNESS COMPONENT, AND FIRST AND SECOND PARAMETERS

(75) Inventor: Yasuo Fukuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 680 days.

(21) Appl. No.: 10/898,247

(22) Filed: Jul. 26, 2004

(65) Prior Publication Data

US 2005/0025356 A1    Feb. 3, 2005

(30) Foreign Application Priority Data

Jul. 31, 2003    (JP)    ............................. 2003-204668

(51) Int. Cl.
  H04N 1/60    (2006.01)
  H04N 5/57    (2006.01)
  H04N 9/68    (2006.01)

(52) U.S. Cl. .................. 348/650; 348/687; 348/673; 348/612; 348/253; 382/167; 382/274; 358/518

(58) Field of Classification Search .............. 348/687, 348/673, 650, 652, 253, 263, 612, 617, 242; 382/167, 274; 358/518, 519, 520, 516
See application file for complete search history.

(56) References Cited

U.S. PATENT DOCUMENTS 3,699,241 A * 10/1972 Larsen .................. 348/680

(Continued)

FOREIGN PATENT DOCUMENTS

JP    08-110603    4/1996

(Continued)

OTHER PUBLICATIONS

Jobson, et al., "A Multiscale Retinex for Bridging the Gap Between Color Images and the Human Observation of Scenes", IEEE Transactions on Image Processing, vol. 6, No. 7, (pp. 965 to 976) (Jul. 1997).

(Continued)

Primary Examiner—David Ometz
Assistant Examiner—Jean W Désir
(74) Attorney, Agent, or Firm—Fitzpatrick, Cella, Harper & Scinto

(57) ABSTRACT

An image processing method aims to optimally improve a brightness distribution with respect to brightness of a face being a main subject of a person image. Thus, the method consists of: a brightness component extraction step of extracting a brightness component from image data; a low-frequency brightness component extraction step of extracting a low-frequency component signal of the brightness component as a low-frequency brightness component; a color adjustment step of performing color adjustment to the image data by using the brightness component and the low-frequency brightness component; a first parameter determination step of determining a first parameter; and a second parameter determination step of determining a second parameter in accordance with a distribution of brightness component values in a second area in the image data, wherein the color adjustment step causes processing a degree of the color adjustment according to the first and second parameters.

18 Claims, 5 Drawing Sheets

U.S. PATENT DOCUMENTS

| | | | |
|---|---|---|---|
| 4,400,721 A * | 8/1983 | Macovski | 348/628 |
| 4,667,224 A * | 5/1987 | Fujisige | 348/228.1 |
| 5,291,276 A * | 3/1994 | Matsumoto et al. | 348/708 |
| 5,485,203 A * | 1/1996 | Nakamura et al. | 348/263 |
| 5,933,252 A * | 8/1999 | Emori et al. | 358/500 |
| 5,973,804 A * | 10/1999 | Yamada | 358/538 |
| 5,974,282 A * | 10/1999 | Yamada | 399/66 |
| 6,072,526 A * | 6/2000 | Hashimoto et al. | 348/223.1 |
| 6,081,254 A * | 6/2000 | Tanaka et al. | 382/167 |
| 6,100,938 A * | 8/2000 | Ha et al. | 348/674 |
| 6,108,037 A * | 8/2000 | Takei | 348/224.1 |
| 6,249,317 B1 * | 6/2001 | Hashimoto et al. | 348/364 |
| 6,515,766 B1 * | 2/2003 | Matama | 358/1.9 |
| 6,806,870 B1 * | 10/2004 | Takanashi | 345/207 |
| 7,006,668 B2 * | 2/2006 | Iguchi et al. | 382/108 |
| 7,065,246 B2 * | 6/2006 | Xiaomang et al. | 382/162 |
| 7,116,819 B2 * | 10/2006 | Zhang | 382/162 |
| 7,142,712 B2 * | 11/2006 | Maruoka et al. | 382/168 |
| 2003/0053159 A1 * | 3/2003 | Ito | 358/518 |
| 2003/0151693 A1 * | 8/2003 | Honda et al. | 348/631 |
| 2004/0212692 A1 | 10/2004 | Nakami et al. | 348/224.1 |
| 2005/0001033 A1 * | 1/2005 | Cheong et al. | 235/454 |

FOREIGN PATENT DOCUMENTS

| | | |
|---|---|---|
| JP | 2000-261650 | 9/2000 |
| JP | 2001-184503 | 7/2001 |
| JP | 2002-185771 | 6/2002 |
| JP | 2003-189236 | 7/2003 |

OTHER PUBLICATIONS

Reinhard, et al., "Photographic Tone Reproduction for Digital Images", acm Transactions on Graphics, vol. 21, No. 3 (Jul. 2002).

* cited by examiner

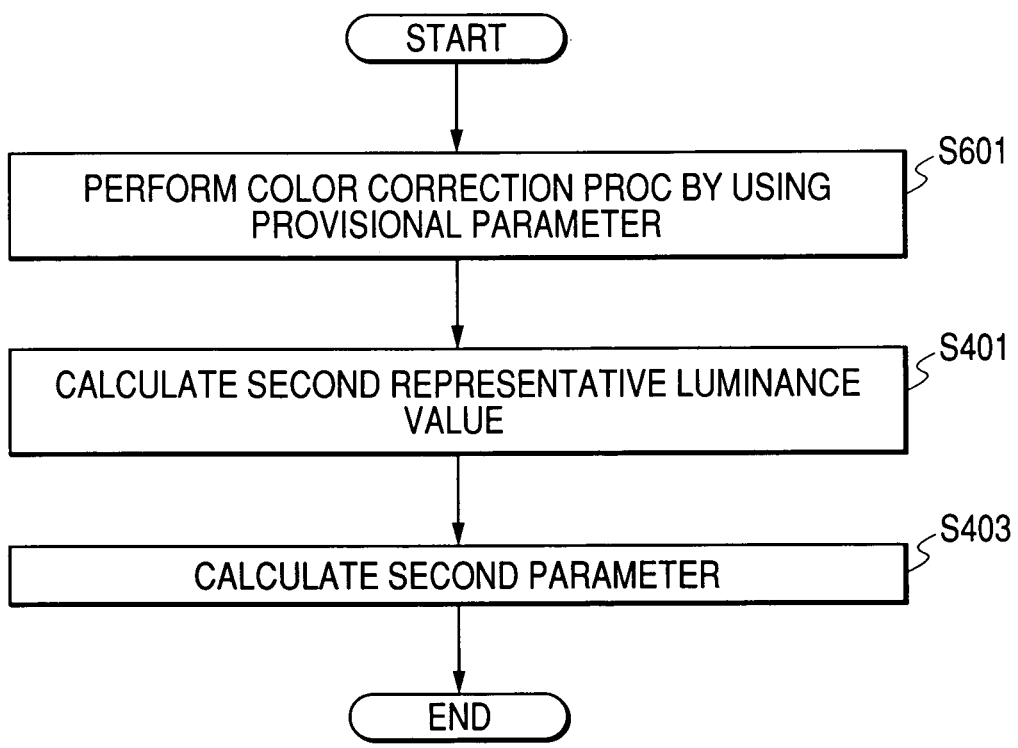
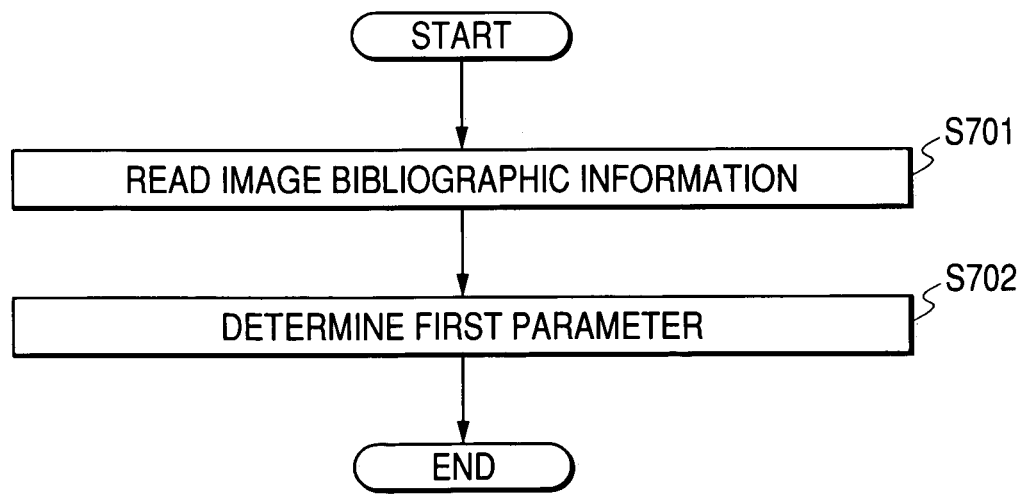

IMAGE PROCESSING METHOD, RECORDING MEDIUM AND APPARATUS FOR PERFORMING COLOR ADJUSTMENT TO IMAGE DATA USING A BRIGHTNESS COMPONENT, A LOW-FREQUENCY BRIGHTNESS COMPONENT, AND FIRST AND SECOND PARAMETERS

This application claims priority from Japanese Patent Application No. 2003-204668 filed Jul. 31, 2003, which is hereby incorporated by reference herein.

BACKGROUND OF THE INVENTION

1. Field of the Invention

The present invention relates to image processing method and apparatus which improve a distribution of brightness.

2. Related Background Art

Conventionally, as a method of taking a photograph of appropriate brightness, a method of measuring average luminance of a scene to be taken or photographed and then controlling shutter speed, an aperture value, and the like, based on the measured average luminance, is known. Moreover, an exposure control method based on so-called evaluation photometry that a scene is first divided into predetermined areas, the luminance of each of the divided areas is measured, the measured luminance is appropriately weighted with respect to each area, the average luminance is then obtained based on the weighted values, and the appropriate exposure is thus obtained with respect to the entire scene is known.

Incidentally, in a scene taken into the light (also called a backlight scene) such that the brightness of a main subject is remarkably dark as compared with that of its background, the main subject portion on a taken or photographed image is inevitably dark. Therefore, to take a photograph in which the appropriate brightness can be secured even in case of a backlight scene, it is necessary at the moment of taking the photograph to preset the exposure of a camera so that the subject is taken brightly as compared with a case of taking an average photograph. However, such an exposure correction operation is troublesome for a user, and moreover skill is required to appropriately set the exposure of the camera. Besides, even if the exposure correction operation is appropriately performed with respect to the main subject, the background portion of the main subject adversely tends to become bright excessively.

In order to solve such a problem, it is necessary to obtain an image of appropriate brightness even in the backlight scene or the like in which it is generally difficult to appropriately determine the brightness of the image.

Thus, to achieve this, in analog photographing technique, printing of appropriate brightness can be obtained by performing so-called a dodging process in a darkroom. Therefore, it is desirable even in a digital image process to easily achieve a dodging process similar to that in the analog photographing technique.

For example, a method of achieving the dodging process is proposed by Daniel J. Jobson et al. in "A Multiscale Retinex for Bridging the Gap Between Color Images and the Human Observation of Scenes", IEEE TRANSACTIONS ON IMAGE PROCESSING, VOL. 6, NO. 7, JULY 1997 (hereinafter called a prior art 1). In this method, a difference process between a component obtained by logarithmic transforming a digital image and a low-frequency component of the logarithmic-transformed component is performed to darken a bright component and brighten a dark component in a low-frequency area in the digital image, thereby achieving image improvement.

Besides, another method of achieving the dodging process in the digital image process is proposed by Reinhard et al. in "Photographic Tone Reproduction for Digital Images", acm Transactions on Graphics, JULY 2002, Vol. 21, No. 3 (hereinafter called a prior art 2). In this method, a dodging-like effect is obtained in the digital image process by using a luminance component of a digital image and a low-frequency component thereof.

Moreover, Japanese Patent Application Laid-Open No. 08-110603 (hereinafter called a prior art 3) proposes a method of inferring an illumination light distribution based on position information and lightness information of a face area and then performing color adjustment according to the inferred illumination light distribution.

However, in such conventional methods, a degree of improvement in a case where large improvement is necessary with respect to the brightness of the main subject in the digital image to be processed is the same as that in a case where a little improvement is necessary with respect to the brightness of the main subject. Therefore, particularly in the case where the little improvement is necessary, the brightness distribution of the image is changed more than is necessary, and the contrast and the saturation of the image are thus excessively enhanced, whereby a satisfactory image cannot be obtained and noise in the image becomes noticeable.

Besides, as described above, the prior art 3 proposes one method of improving a brightness distribution based on the brightness of the face area. However, in this method, because a lightness distribution is obtained from the position information of the face area and the lightness information of each area, a problem occurs in a case where the image in question includes only one face area. In other words, it is described in the prior art 3 that the barycenter of the face area or the barycenter of the face area and other several points of the face area is used as the position information of the face area. However, when the barycenter of the face area is used as the position information of the face area, it is very difficult to correctly infer the illumination right distribution of the entire image from one point of one area. Moreover, it is doubtful whether the image which has been color-adjusted according to some inference result is preferable. In addition, even when the barycenter of the face area and other several points of the face area are used as the position information of the face area, it is also doubtful whether the image which has been color-adjusted by inferring the lightness distribution of the entire image from the lightness distribution of one face area is preferable.

SUMMARY OF THE INVENTION

An object of the present invention is to solve the above conventional problems, and furthermore to be able to optimally adjust a brightness distribution with respect to a main subject of a digital image to be processed, e.g., brightness of a face being main subject in a person image.

In order to achieve the above objects, the present invention is characterized by an image processing method, which comprises a brightness component extraction step of extracting a brightness component from image data, a low-frequency brightness component extraction step of extracting a low-frequency component signal of the brightness component as a low-frequency brightness component, and a color adjustment step of performing color adjustment to the image data by using the brightness component and the low-frequency brightness component, the method comprising: a first parameter determination step of determining a first parameter; and a second parameter determination step of determining a second parameter in accordance with a distribution of brightness component values in a second area in the image data, wherein the color adjustment step causes processing a degree of the color adjustment in accordance with the first parameter and the second parameter.

Other objects and features of the present invention will be apparent from the following description in conjunction with the accompanying drawings.

BRIEF DESCRIPTION OF THE DRAWINGS

FIG. 6 is a flow chart showing a flow of a second parameter calculation process to be performed in the second embodiment; and FIG. 7 is a flow chart showing a flow of a parameter determination process to be performed in the step S203 in the third embodiment.

DETAILED DESCRIPTION OF THE PREFERRED EMBODIMENTS

First Embodiment

Hereinafter, the constitution of the present embodiment will be explained in detail with reference to the accompanying drawings.

Figure 1:
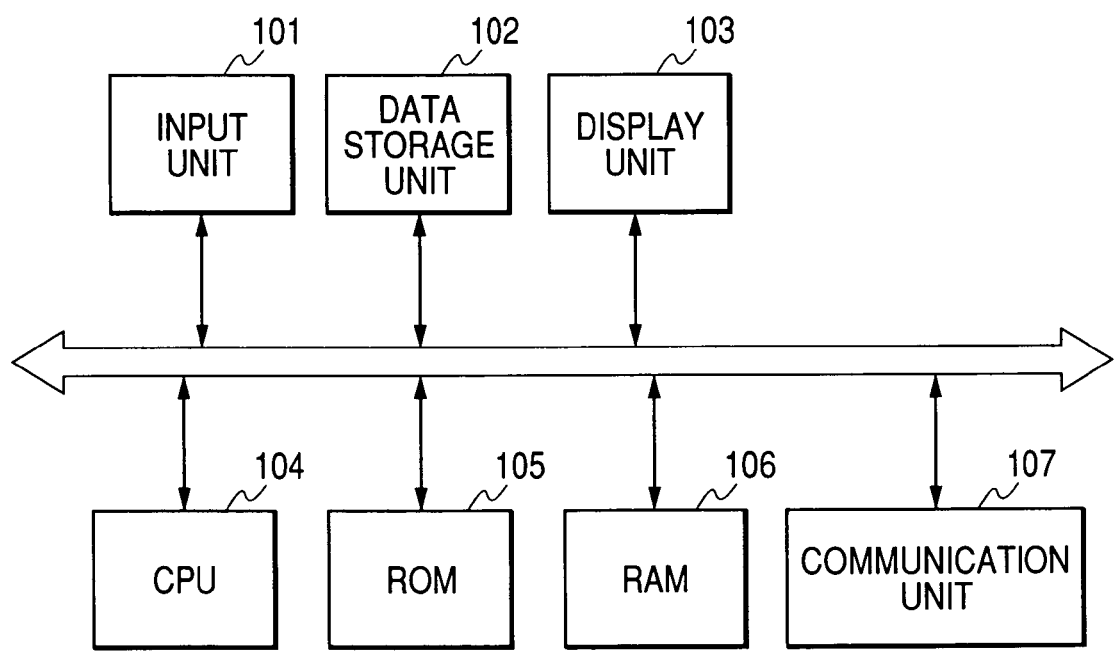
FIG. 1 is a block diagram showing the structure of an image processing apparatus according to the first embodiment.

FIG. 1 is a block diagram showing a structural example of an image processing apparatus capable of realizing an image processing method of the present embodiment.

In FIG. 1, an input unit 101, which is a device for inputting instructions or data from a user, includes a keyboard and a pointing device. As the pointing device, there is a mouse, a trackball, a trackpad, a tablet or the like. In case of applying the present example to a known digital camera, the pointing device may be structured by buttons, a mode dial or the like. Further, it may be structured that the keyboard is structured by software (software keyboard), and the buttons, the mode dial or the above-mentioned pointing device is operated to input characters.

A data storage unit 102, which is a section of storing image data, is generally structured by a hard disk, a Floppy® disk, a CD-ROM, a CD-R, a DVD (Digital Versatile Disk), a memory card, a CF (Compact Flash) card, a Smart Media, an SD (Secure Digital) card, a memory stick, an xD-picture card or the like. Programs or another data can be also stored in the data storage unit 102 other than the image data.

A communication unit 107 is an interface (I/F) for performing communications among devices. As the I/F, a communication method by cables such as a known method by an Ethernet (R), a USB (Universal Serial Bus), an IEEE (Institute of Electrical and Electronics Engineers) 1284, an IEEE1394, a telephone line or the like may be used, or a communication method by radio such as a method by infrared rays based on the IRDA (Infrared Data Association) standard, an IEEE802.11a standard, an IEEE802.11b standard, an IEEE802.11g standard, a Bluetooth standard, a UWB (Ultra Wide Band) standard or the like may be used.

A display unit 103 displays images before or after performing an image process or images by a GUI (Graphical User Interface) or the like. As the display unit, a CRT, a liquid crystal display or the like is generally used. Or, a display device out of the apparatus connected by a cable or the like may be used for the display unit.

A CPU 104 functions for all the processes to be performed in the above-mentioned structure. A ROM 105 and a RAM 106 provide programs, data, a work area and the like necessary for the processes to the CPU 104. A control program necessary for a process to be described later is stored in a recording medium, e.g., the data storage unit 102 or once read in the RAM 106 in a case that the control program is stored in the ROM 105 and then the control program is operated.

Otherwise, although the structure is not shown, it may be modified that an image data input means composed of a known CCD or the like is provided to input image data and the input image data are accumulated in the data storage unit 102.

As to the system structure, although there are various structural elements other than the above-mentioned elements, since those structural elements are not aimed by a main object of the present invention, an explanation thereof will be omitted.

Figure 2:
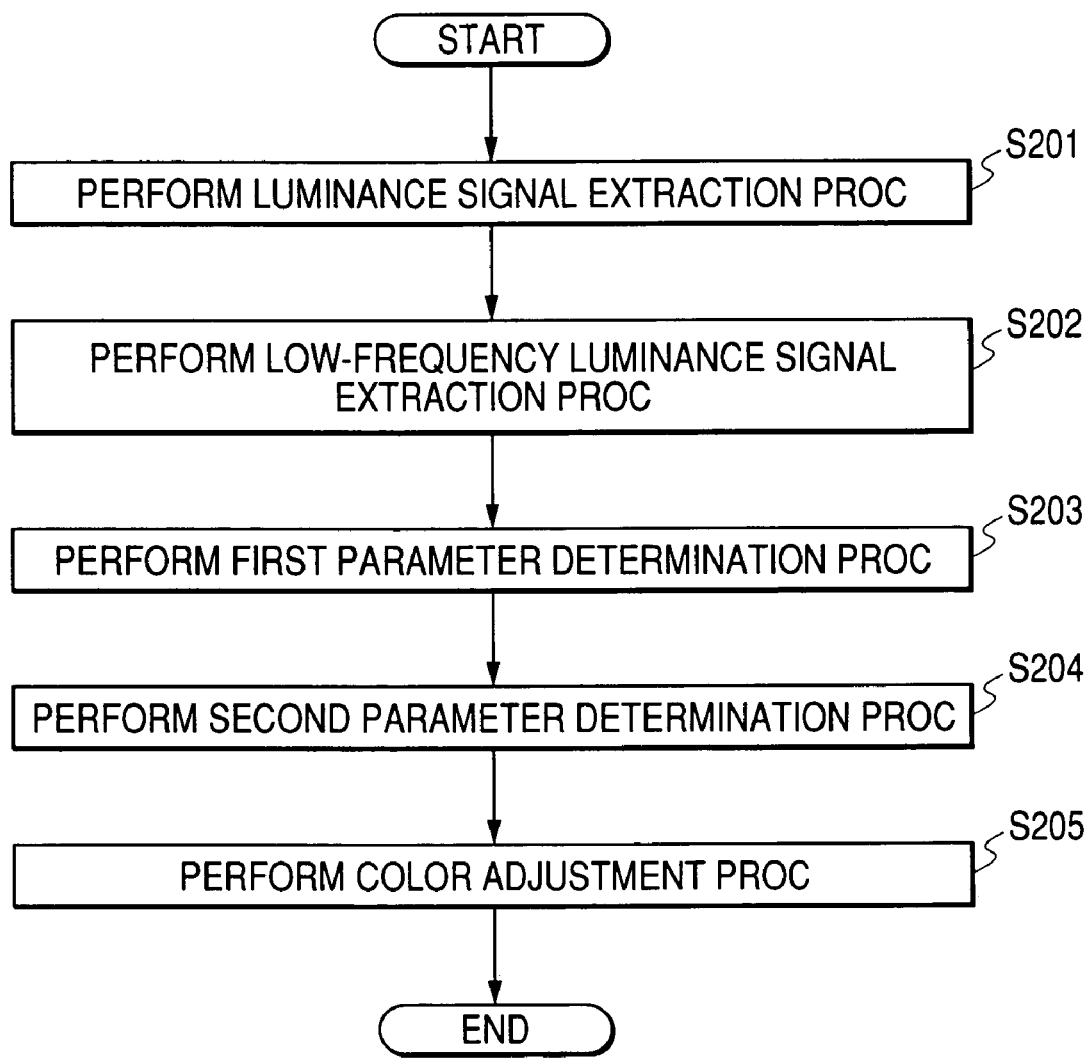
FIG. 2 is a flow chart showing a process flow of an image processing method according to the first embodiment.

FIG. 2 is a flow chart showing a process flow of the image processing method according to the present embodiment.

Image data, on which a color adjustment process according to the flow chart shown in FIG. 2 is performed, is stored in the RAM 106 or the data storage unit 102 shown in FIG. 1. As to designation of the image data to be color adjusted, for example, a list of image data stored in the RAM 106 or the data storage unit 102 is displayed on the display unit 103, and a user may designate the corresponding image data by operating the input unit 101. Otherwise, for example, if the data storage unit 102 is a detachable storage device (for example, a hard disk, a Floppy® disk, a CD-ROM, a memory card or the like which is removable), installation of the data storage unit 102 is detected to treat the detected result as a trigger, and it may be structured that the image data stored in the data storage unit 102 are sequentially transferred to a section in which the process to be explained in the flow chart shown in FIG. 2 is performed. As mentioned above, in case of including the image data input means such as the known CCD, an image inputting operation performed from the image data input means is treated as a trigger, and a process may be performed in a manner that the input image data is stored in the RAM 106 or the data storage unit 102 and is simultaneously transferred to the section on which the process to be explained in the flow chart shown in FIG. 2 is performed. Further, in case of performing communication by connecting with other devices through the communication unit 107, an image data transmission performed by other devices connected through the communication unit 107 is treated as a trigger, and a process may be performed in a manner that the received image data is stored in the RAM 106 or the data storage unit 102 and the input image data is simultaneously transferred to the section in which the process to be explained in the flow chart shown in FIG. 2 is performed.

In the image processing method according to the flow chart shown in FIG. 2, image data to be color adjusted is initially read, and the luminance component and the color component are extracted (step S201).

With respect to extraction of the luminance component, for example, in a case that the image data to be color adjusted is represented by an sRGB color space described in the EEC (International Electro-technical Commission) 61966-2-1, the image data is converted into image data of CIE (Commission Internationale de l'Eclairage, International Commission on Illumination) 1931XYZ by a gamma conversion and a 3×3 matrix operation in accordance with a method described in the EEC 61966-2-1. Here, when the converted X, Y and Z data after performing the above-mentioned conversion to a pixel value of (R(x,y), G(x,y), B(x,y)) on a position of (x,y) are assumed to be respectively represented as X(x,y), Y(x,y) and Z(x,y), data of Y(x,y) corresponds to the luminance component to be extracted, and data of X(x,y) and Z(x,y) correspond to the color components. When the luminance extraction is organized by hardware, for example, it can be organized by a table reference circuit (section of gamma conversion) according to a look-up table and a matrix operation circuit.

As a method of extracting the luminance component, the above-mentioned process is simplified by omitting the gamma conversion, and the luminance component may be extracted by only the matrix operation. Instead of using the image data of CIE 1931XYZ, it may be modified that:

Y-value in an YCbCr color space is assumed as the luminance component and Cb-value and Cr-value are assumed as the color components, L*-value in an L*a*b* color space is assumed as the luminance component and a*-value and b*-value are assumed as the color components, V-value in an HSV color space is assumed as the luminance component and H-value and S-value are assumed as the color components, and L-value in an HSL color space is assumed as the luminance component and H-value and S-value are assumed as the color components.

In this case, color space conversions respectively corresponding to the above-mentioned color spaces are used.

It is preferable to use the color space conversion regulated by the standard. However, a method of using an approximate calculation may be used. For example, conversion from RGB data into the Y-value in the YCbCr color space is represented by the following transforming equation (1).

$$Y = 0.299 \times R + 0.587 \times G + 0.114 \times B \quad (1)$$

On the other hand, an approximate equation as in the following equation (2) may be used.

$$Y = (3 \times R + 6 \times G + B)/10 \quad (2)$$

Further, a G signal value of R, G and B signal values may be used as an approximation of the luminance component, or a mean value or a maximum value of the R, G and B signal values may be used as the luminance.

In this example, it has been explained that the input image data is represented by the sRGB color space. However, even if a color space is an RGB color space (for example, Adobe RGB, RIMM/ROMM RGB or the like) other than the sRGB color space, the image data may be converted into the image data of CIE 1931XYZ (or another color space described in the foregoing) in accordance with a definition of each color space.

With respect to conversion of the color space, the conversion may be performed in accordance with the definition or the transforming equation of the each color space or may be performed by using a known ICC (International Color Consortium) profile. This method is effective in a case that, for example, the R, G and B data correspond to the R, G and B signal values depending on a device (device RGB values) and conversion of the image data cannot be represented by a simple transforming equation.

Even if the input image data is represented by, for example, an sYCC color space other than the RGB color space, similarly the color space conversion may be performed by using a color space transforming equation used for converting the image data of sYCC into the image data of CIE 1931XYZ (or another color space described in the foregoing) or by a conversion according to the ICC profile.

However, in a case that an original color space coincides with a color space of the luminance value in such a state that the original image is represented by the sYCC color space and Y data of the YCbCr image data is used as the luminance, the Y-value of sYCC signals of the original image may be merely extracted, and a color space conversion process is not required.

In a next step S202, a low-frequency luminance signal is extracted.

With respect to extraction of the low-frequency luminance signal, for example, a convolution operation with the extracted luminance component and a Gaussian function is performed as in the prior art 1 to supply an output (however, in the prior art 1, the convolution operation is directly performed to pixels of R, G and B data of the image data but is not performed to the luminance component of the image data). In order to raise image quality of the improved image data, it is preferable that the convolution operation with the plural Gaussian functions different in the standard deviation is performed to obtain a distribution of the luminance component on plural scales. It should be noted that the above-mentioned extraction of the low-frequency luminance signal is called a scale conversion hereinafter. In case of organizing the scale conversion by the hardware, for example, it can be organized by a convolution operation circuit.

In steps from a next step S203 to a step S204, a parameter used in a color adjustment process to be performed in a step S205 is determined. Before an explanation of a parameter determination process, the color adjustment process is initially explained.

As an example of the color adjustment process, according to a method based on the prior art 1, a logarithmic transformation is performed to the luminance component and the distribution of the luminance component to which the scale conversion was performed, and the obtained difference between them is output. Further, a weighted average of a difference output on different scales is assumed as the improved luminance component. However, since a degree of improvement cannot be adjusted in accordance with an image by this method, a logarithmic transformation output of the luminance component, to which the scale conversion was performed, is multiplied by a coefficient. This coefficient corresponds to a parameter of adjusting the degree of improvement. An output of the improved luminance component on the basis of the above-explained process is indicated by the following equation (3).

$$Y'(x, y) = \sum_n w_n \{\gamma_0 \cdot \log Y(x, y) - \gamma_1 \cdot \log[F_n(x, y) * Y(x, y)]\} \quad (3)$$

Here, Y'(x,y), $F_n$(x,y), $w_n$, n, γ0 and γ1 respectively denote an output of the improved luminance component of which coordinates are (x,y), a Gaussian function on the coordinates (x,y), weight between scales, a parameter for representing the scale, a parameter 0 for representing the degree of improvement and a parameter 1 for representing the degree of improvement. Further, a symbol (*) denotes the convolution operation.

It is understood that the weight between the scales can be omitted by adjusting a standard deviation of the scale (replaced to a simple average) and it is preferable to return a luminance unit to an original luminance unit by an inverse transformation (exponential function) rather than a value of logarithmic transformed is output as in the equation (3) as image quality of the improved image data. Therefore, it is preferable that an output indicated by the following equation (4) is assumed as the improved luminance component.

$$Y'(x,y)=\exp<\gamma_0 \cdot \log Y(x,y)-\gamma_1 \cdot \text{Avg}\{\log [F_n(x,y)*Y(x,y)]\}> \quad (4)$$

Here, the Avg indicates a mean value operation.

The following equation (5) may be available instead of the equation (4).

$$Y'(x, y) = \frac{Y(x, y)^{\gamma_0}}{[\text{Avg}\{F_n(x, y) * Y(x, y)\}]^{\gamma_1}}. \quad (5)$$

It should be noted that the mean value operation of a scale conversion output on the plural scales is performed in a process of extracting the low-frequency luminance signal to be performed in the step S202, and a mean value of the scale conversion output on the plural scales may be treated as the distribution of the luminance component to which the scale conversion was performed.

In case of organizing this luminance conversion by the hardware, for example, it can be organized by a mean value operation circuit, a circuit for forming the look-up table, a table storage unit, the table reference circuit (section of gamma conversion) and a division circuit. The mean value operation circuit may be provided in a section of realizing the extraction of the low-frequency luminance signal.

In the color adjustment process, the color component is corrected in accordance with the change of the luminance component such that color of the processed image data does not change as much as possible. Preferably, for example, the color components X(x,y) and Z(x,y) are respectively multiplied by a ratio Y'(x,y)/Y(x,y) between before and after changing the luminance component. Meanwhile, the process is easily simplified in such a manner that only the luminance component Y(x,y) is changed to the luminance component Y'(x,y) by the equation (5) and the color components X(x,y) and Z(x,y) are not processed.

Then, the color space conversion is performed to the corrected image data of X, Y and Z to obtain the sRGB image data. A process performed in this case corresponds to an inverse conversion of the color space conversion process performed in the step S201. Therefore, the 3×3 matrix operation and an inverse gamma conversion process are performed to output eight-bit sRGB image data. In case of organizing the reconstitution of the image data by the hardware, it can be organized by, for example, a multiplication and division circuit, the matrix operation circuit, a table reference circuit (section of inverse gamma conversion) according to the look-up table.

In case of using another method such as conversion from the sRGB data into the YCbCr data as a method of extracting the luminance component in the step S201, it is needless to say that a process of the corresponded inverse conversion has to be performed in this process.

In the present embodiment, the corrected pixel value data was converted into the data of sRGB color space. However, in this process, it is only returned to a color space before correcting color, and the corrected pixel value data is not always required to return to the data of the color space before collecting color. Therefore, in accordance with the convenience of an image process after correcting color, it may be converted into another color space (for example, YCbCr color space) or the image data of X, Y and Z themselves which are not converted may be stored in the RAM 106 or the data storage unit 102 shown in FIG. 1.

In case of using a G-value of the R, G and B data or a mean value of the R, G and B signal values as the luminance, the R, G and B signal values of pixels are respectively multiplied by the ratio Y'(x,y)/Y(x,y) between before and after changing the luminance component, and the R, G and B values may be corrected. Similarly, in case of using the Y-value of the XYZ image data, the Y-value of the YCbCr image data or the L*-value of the L*a*b* image data as the luminance, the R, G and B values of original pixels are respectively multiplied by the ratio Y'(x,y)/Y(x,y) between before and after changing the luminance component, and the R, G and B values may be corrected.

The above-mentioned process corresponds to the color correction (adjustment) process. In the color correction process, since the two parameters (γ0 and γ1 indicated in the equation (5)) of representing the degree of improvement exist as the parameters to be determined in accordance with the image, the parameters are determined before the color correction process to be performed in the step S205.

With respect to the parameters, the parameter γ0 indicated in the equation (5) is determined as a first parameter in the step S203 in FIG. 2, and the parameter γ1 indicated in the equation (5) is determined as a second parameter in the step S204.

Figure 3:
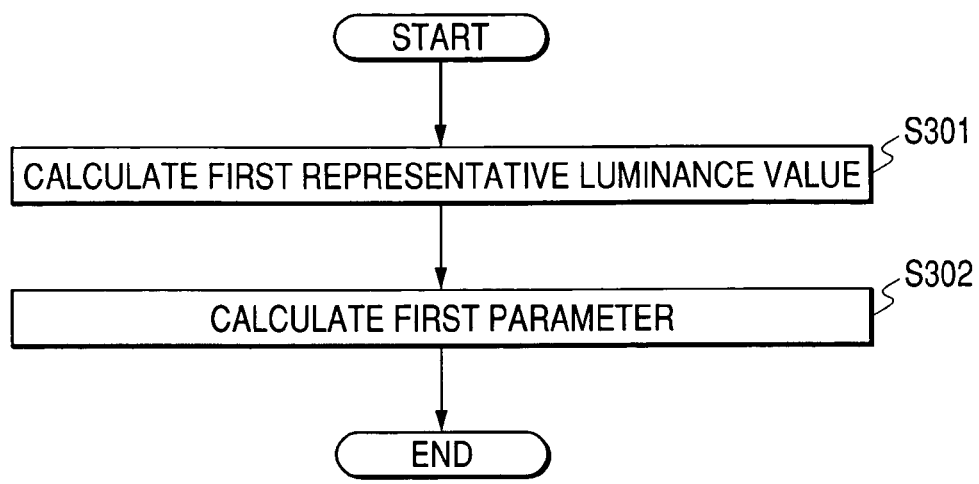
FIG. 3 is a flow chart explaining a process to be performed in a step S203.

The process to be performed in the step S203 will be explained with reference to FIG. 3. However, before that explanation, the first parameter γ0 will be previously explained.

Initially, the following equation (6) is obtained by modifying the equation (5).

$$Y'=Y^{\gamma_0} \times [\text{Avg}\{F_n(x,y)*Y(x,y)\}]^{\gamma_1} \quad (6)$$

Here, when it is especially assumed that γ1=0, the following equation (7) is obtained.

$$Y'=Y^{\gamma_0} \quad (7)$$

The above-mentioned process is an ordinary gamma conversion process. In this case, when the parameter γ0 is smaller than 1 (γ0<1), the image is to be corrected to become the light image, and when the parameter γ0 is larger than 1 (γ0>1), the image is to be corrected to become the dark image regardless of the distribution condition of the luminance component. Therefore, it is considered that the parameter γ0 is such a parameter of adjusting brightness of the whole image. Accordingly, it is preferable that the parameter γ0 is adjusted in accordance with brightness of the whole image.

The process to be performed in the step S203 will be explained with reference to FIG. 3. In order to determine the parameter γ0, a representative luminance value of the whole image is initially calculated (step S301). In the present embodiment, the average luminance of the whole image is assumed as the representative luminance of the whole image (first representative luminance). With respect to the average luminance of the whole image, it may be obtained in such a manner that pixels of the image are converted into the luminance and the average of the luminance values obtained by the conversion is calculated. Since the representative luminance in this time is used together with the low-frequency luminance in the color adjustment process performed by using the equation (5), the same luminance value as that calculated in the step S201 has to be used. In the present embodiment, since the Y-value of the image data of CIE 1931XYZ is used as the luminance in the step S201, also in the calculation of the first representative luminance to be performed in the step S301, the Y-values of the image data of CIE 1931XYZ for the pixels are calculated, and the average of the Y-values is calculated. The average luminance of the whole image calculated in the step S301 is assumed as $Y_{ave0}$ to continue the following explanation.

In a next step S302, the parameter γ0 is determined in accordance with the representative luminance of the whole image (first representative luminance) obtained in the step S301.

Figure 5:
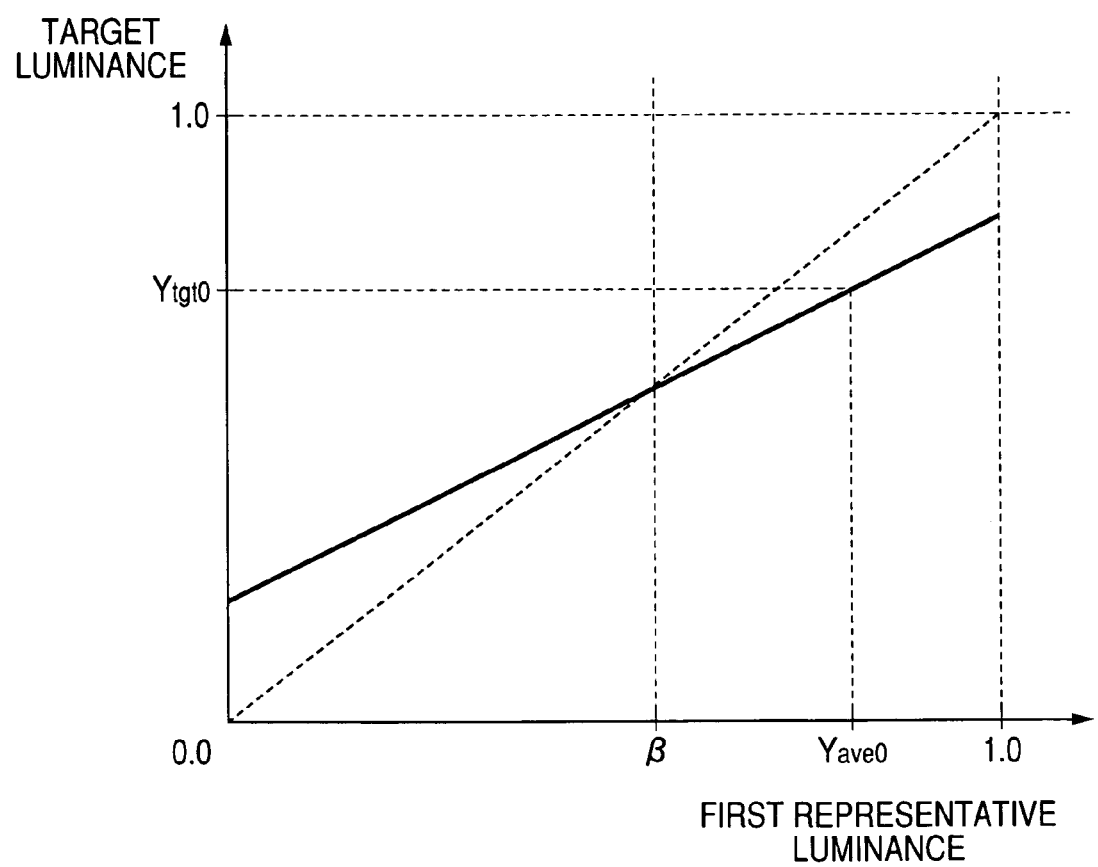
FIG. 5 is a view showing an example of the corresponding relationship between average luminance of a whole image and target luminance after performing the color correction.

In order to calculate the parameter γ0, the target luminance after performing the color correction is determined for the average luminance of the whole image, and the parameter γ0 is calculated in accordance with the target luminance. FIG. 5 is a view showing an example of the corresponded relationship between the average luminance of the whole image and the target luminance after performing the color correction. In a graph shown in FIG. 5, a horizontal axis indicates the average luminance value of the whole image, and a vertical axis indicates the target luminance after performing the color correction. The graph shown in FIG. 5 indicates such the corresponded relationship, wherein when the average luminance value of the whole image is larger than β, the color is correct to darken the image, and when the average luminance value of the whole image is smaller than β, the color is corrected to lighten the image. The corresponded relationship shown in FIG. 5 is, for example, stored in the ROM 105 or the data storage unit 102 as a table, which is read in the RAM 106 and is referred when the image is processed. It may be constituted that a parameter representing the corresponded relationship is stored in the ROM 105 or the data storage unit 102, and a table corresponding to the corresponded relationship shown in FIG. 5 is created on the RAM 106 from the parameter, and the table is referred when the image is processed.

Now, as shown in FIG. 5, when the target luminance for the average luminance $Y_{ave0}$ obtained in the step S301 is assumed as $Y_{tgt0}$, a value of γ0 is calculated from the following equation (8).

$$Y_{tgt0} = Y_{ave0}{}^{\gamma 0} \quad (8)$$

Or, the value of γ0 is calculated from the following equation (9) obtained by modifying the equation (8).

$$\gamma 0 = \frac{\log Y_{tgt0}}{\log Y_{ave0}} \quad (9)$$

However, when a value of the $Y_{ave0}$ is equal to 0 or 1, the equations (8) and (9) have no solution, and this state indicates that the whole image is pure black or pure white. Therefore, an exceptional process may be performed. As a simple method, it may be constituted that the first parameter γ0 is assumed as 1 and the process is continued, or a result of error is displayed on the display unit 103 and the whole process is terminated.

As mentioned above, the first parameter γ0 is calculated in the step S203. In the present embodiment, for the sake of convenience in the explanation, it is explained by assuming that the $Y_{ave0}$ and $Y_{tgt0}$ are within a range from 0 to 1, because the luminance is normalized. Therefore, in a case that the pixel value or the luminance value is represented by, for example, eight-bit unsigned integer (0 to 255), the luminance value is normalized and the process is performed, or the above equations are modified to fit a range of the luminance value and the process may be performed.

In the next step S204, the second parameter γ1 is calculated. The process to be performed in the step S204 will be explained with reference to FIG. 4. However, before that explanation, the parameter γ1 will be previously explained.

In the equation (6), when it is assumed that γ0=1, that is, when the brightness of an entire image is not changed, the following equation (12) is obtained.

$$Y' = Y \times [\text{Avg}\{F_n(x,y) * Y(x,y)\}]^{-\gamma 1} \quad (12)$$

In the equation (12), the $\text{Avg}\{F_n(x,y) * Y(x,y)\}$ denotes a low-frequency luminance value of the original image. Therefore, it is understood that an original luminance value Y is corrected in accordance with brightness of a target pixel and vicinity pixels by treating the γ1 as a parameter. In a case that the γ1 is smaller than 0 (γ1<0), when the brightness of the target pixel and the vicinity pixels becomes darker, the image becomes darker, and in a case that the γ1 is larger than 0 (γ1>0), when the brightness of the target pixel and the vicinity pixels becomes darker, the image becomes light with a larger rate.

Therefore, the parameter γ1 varies balance between lightness and darkness in the image. In case of varying the balance between lightness and darkness in an image of person against the sunbeam, aimed by the present embodiment, it is preferable that this parameter is adjusted on the basis of brightness on a face of person.

In the step S204, the second parameter γ1 is calculated. A process to be performed in the step S204 will be further explained with reference to FIG. 4.

Initially, in a step S401, the representative luminance on a face area is calculated as the second representative luminance. In the present embodiment, as the representative luminance, the average luminance on an area is assumed as the representative luminance (second representative luminance) on the area.

The face area, which corresponds to a partial area of including a face of person in the image to be corrected, may be previously set before performing the image process. With respect to the set of the face area, a known face area detection process is performed, and the detected face area may be used. It may be processed that the image to be processed is displayed on the display unit 103 and then a user sets the face area by operating the input unit 101. A setting method of the face area is not the aim of the present embodiment, and the face area may be previously set before the process to be performed in the step S401.

In the step S401, the luminance values of pixels contained in the face area are obtained, and the average of those luminance values is obtained to calculate the average luminance on the area. Since the representative luminance in this time is used together with the low-frequency luminance in the color adjustment process performed by using the equation (5), the same luminance value as that calculated in the step S201 has to be used. In the present embodiment, since the Y-value of the image data of CIE 1931XYZ is used as the luminance in the step S201, also in the calculation of the second representative luminance performed in the step S401, the Y-values of the image data of CIE 1931XYZ for the pixels in the face area are calculated and the average of the calculated values is obtained.

Even in a case that plural face areas are set for the image, the one representative luminance is determined for all of the plural areas. As the simplest method, the luminance values of the pixels contained in the respective areas are calculated, and the calculated luminance values are summed up and then the summed up value is divided by the total number of pixels contained in the respective areas to calculate the average luminance.

The average luminance (second representative luminance) of the face area calculated in the step S401 is assumed as $Y_{ave1}$ to continue the following explanation.

In a next step S402, the second representative luminance $Y_{ave1}$ calculated in the step S401 is corrected.

The correction in the step S402 is performed to determine the parameter γ1 such that the brightness on the face area becomes a suitable condition in the color correction performed by using the equation (5). This process is performed to check the too much or too little of the brightness on the face area in a case that only the adjustment of brightness of the whole image according to the already determined parameter γ0 is performed and to determine the parameter γ1 from the checked result. Therefore, the representative luminance $Y_{ave1}'$ on the face area after performing only the adjustment of brightness of the whole image according to the parameter γ0 is estimated. The $Y_{ave1}'$ corresponds to the luminance Y' obtained in a condition that it is assumed that $Y=Y_{ave1}$ in the equation (7). That is, the $Y_{ave1}'$ is calculated by the following equation (13).

$$Y_{ave1}' = Y_{ave1}^{\gamma 0} \tag{13}$$

In a next step S403, the second parameter is calculated from the second representative luminance value corrected in the step S402 and the first parameter calculated in the step S203.

Before calculating the second parameter, the target luminance on the face area is initially determined.

The ideal brightness on the face area is assumed as values from $Y_{ideal0}$ to $Y_{ideal1}$ ($Y_{ideal0} < Y_{ideal1}$). These values are previously determined. Generally, since it was reported that the ideal face brightness corresponds to such rates from 60% to 90% of the maximum brightness, it is preferable that the rates from 0.6 to 0.9 are set (that is, in a case that the pixel value or the luminance value is represented by eight-bit unsigned integer, values from 153 (=0.6×255) to 230 (=0.9×255) are set).

The target luminance on the face area is calculated by the following equation (14).

$$Y_{tgt1} \begin{cases} \alpha \cdot Y_{ideal0} + (1-\alpha) \cdot Y_{ave1}' & (Y_{ave1}' < Y_{ideal0}) \\ Y_{ave1}' & (Y_{ideal0} \le Y_{ave1}' \le Y_{ideal1}) \\ \alpha \cdot Y_{ideal1} + (1-\alpha) \cdot Y_{ave1}' & (Y_{ave1}' > Y_{ideal1}) \end{cases} \tag{14}$$

Here, a symbol α denotes a parameter of determining a degree of brightness adjustment, and the value of α exists within a range of $0 \le \alpha \le 1$. The parameter α is previously determined. Originally, although the value of $Y_{tgt}$ has to be existed within a range from the value of $Y_{ideal0}$ to the value of $Y_{ideal1}$, if a degree of correction becomes too large due to a fact that the face area is darkened by, especially, the backlight, the image quality is deteriorated by another factor such as the emphasized noise or the like in the image. Therefore, the parameter α controls at what rate the brightness is approached to the preferable direction (light direction or dark direction). According to the experiment, a preferable result is obtained by the parameter α which exists within a range of rate from ½ to ¼.

Next, the second parameter is calculated by using the target luminance on the face area, the second representative luminance and the first parameter. Since the $Avg\{F_n(x,y)*Y(x,y)\}$ indicated in the equation (5) corresponds to the brightness of the target pixel Y(x,y) and the vicinity pixels, the $Avg\{F_n(x, y)*Y(x,y)\}$ is approximated by the target pixel (x,y), further when the $Y_{ave1}'$ is substituted in the Y(x,y) and the $Y_{tgt1}$ is substituted in the Y'(x,y), finally, the following equation (15) is obtained.

$$Y_{tgt1} = \frac{Y_{ave1}'^{\gamma 0}}{Y_{ave1}'^{\gamma 1}} = Y_{ave1}'^{(\gamma 0 + \gamma 1)} \tag{15}$$

Or, the second parameter is calculated by the following equation (16) obtained by modifying the equation (15).

$$\gamma_1 = \frac{\log Y_{tgt1}}{\log Y_{ave1}'} - \gamma_0 \tag{16}$$

As mentioned above, the second parameter γ1 is determined in the step S204.

The present embodiment will be again explained with reference to FIG. 2. In a subsequent step S205, the color correction is performed by using the first parameter γ0 determined in the step S203 and the second parameter γ1 determined in the step S204. Here, the detail of the color correction is refrained from explanation because it has been previously explained.

When the color correction ends, the entire process in the image processing method according to the present embodiment ends. Preferably, the image which has been color-corrected is displayed on the display unit 103, stored in the data storage unit 102 according to a predetermined image format, or transmitted to another not-shown image processing apparatus (e.g., a printer) through the communication unit 107.

Incidentally, although the average luminance value is used as the first and second representative luminance values in the present embodiment, a weighted average value obtained through weighting according to the position in the pixel area may be used as a modification. For example, it is possible to apply a large weight to the central portion in the area and apply a small weight or zero weight to peripheral portions of the area.

Further, in the representative luminance value calculation process, for example, it is possible as a modification to first calculate a luminance histogram and then calculate a central value and a mode value based on the luminance histogram as the representative luminance value. Moreover, a method of calculating the representative luminance value by analyzing the luminance histogram is conceivable. For example, in this method, when an area including the face area is designated, protruded and flat portions in the histogram are respectively discriminated, and the average value, the central value and the mode value are obtained by using only the pixels included in the specific protruded portion.

Furthermore, although the entire image is used as the first area in the present embodiment, the present invention is not limited to this. That is, because the first area only has to be larger than the second area, an area which is obtained by eliminating the upper, lower, right and left edges of the entire image respectively by several percent (i.e., the central portion obtained by eliminating the respective edges of the entire image) may be used as a modification.

Moreover, although the entire image being the first area includes the second area in the present embodiment, it is easily possible as a modification to set the area obtained by eliminating the second area from the entire image as the first area.

Besides, in the present embodiment, when the plural face areas have been set, the luminance values of the pixels included in the respective face areas are calculated and added together, and the average value is calculated by dividing such a sum by a sum total of the pixels included in the respective face areas, thereby calculating the average value as the second representative value. However, a weighting process according to a property of the area may be performed as a modification. For example, the weighting process may be performed according to the dimension of the area (that is, larger weight is added to the pixel belonging to the larger area (larger-photographed face area), the position of the area (that is, larger weight is added to the pixel belonging to the area closer to the center of the image), the average luminance value of the respective areas, or the representative luminance value (that is, larger weight is added to the area properly and brightly photographed).

Moreover, although the luminance average value is used as both the first and second representative luminance values in the present embodiment, the method of calculating the first representative luminance value need not be the same as that of calculating the second representative luminance value. Thus, for example, as a modification, the weighted average value of the pixel positions of the entire image can be used as the first representative luminance value and the mode value of the face area can be used as the second representative luminance value.

Furthermore, although the first and second representative luminance values are calculated respectively in the steps S203 and S204 in the present embodiment, these representative luminance values may be calculated in concurrence with the luminance extraction in the step S201 as a modification. Besides, it is possible to form the luminance histograms respectively for the entire image and the face area in the step S201, and then calculate the respective representative luminance values by referring to the respective luminance histograms for the entire image and the face area in the steps S203 and S204.

In addition, in the second representative luminance correction process, it is possible to first correct the luminance histogram of the face area by applying the conversion process by the equation (7) to each bin (i.e., level) of the histogram, and then calculate the second representative luminance according to the corrected luminance histogram.

Moreover, in the case where the target luminance of the face area is calculated in the present embodiment, such calculation is performed so that the target luminance gets close to the preferable face brightness within the range $Y_{ideal0}$ to $Y_{ideal1}$, More specifically, the target luminance is calculated so as to get close to $Y_{ideal0}$ when $Y_{tgt1}$ is smaller than $Y_{ideal0}$, while the target luminance is calculated so as to get close to $Y_{ideal1}$ when $Y_{tgt1}$ is larger than $Y_{ideal1}$. However, it is conceivable that the above calculation is modified as shown by the following equation (17) so as not to darken the face area even if it seems to be too bright. In that case, $Y_{ideal1}$ need not be determined previously.

$$Y_{tgt1} = \begin{cases} \alpha \cdot Y_{ideal0} + (1-\alpha) \cdot Y'_{ave1} & (Y'_{ave1} < Y_{ideal0}) \\ Y'_{ave1} & (Y_{ideal0} \le Y'_{ave1}) \end{cases} \quad (17)$$

Moreover, in the above, the eight-bit R, G and B unsigned integer data or the real number values within the range 0 to 1.0 obtained by normalizing the unsigned integer data is handled as the image data to be processed. However, it is apparent that the present invention is easily applicable also to, e.g., n-bit unsigned integers (n is a positive integer).

Second Embodiment

In the second embodiment, only the point different from the first embodiment will be explained.

In the second parameter calculation process of the first embodiment, the second representative luminance value is corrected after it was calculated, and then the second parameter is calculated. The present embodiment is different from that first embodiment in the point that the second representative luminance value is calculated after a provisional parameter applying process was performed, and then the second parameter is calculated.

Figure 4:
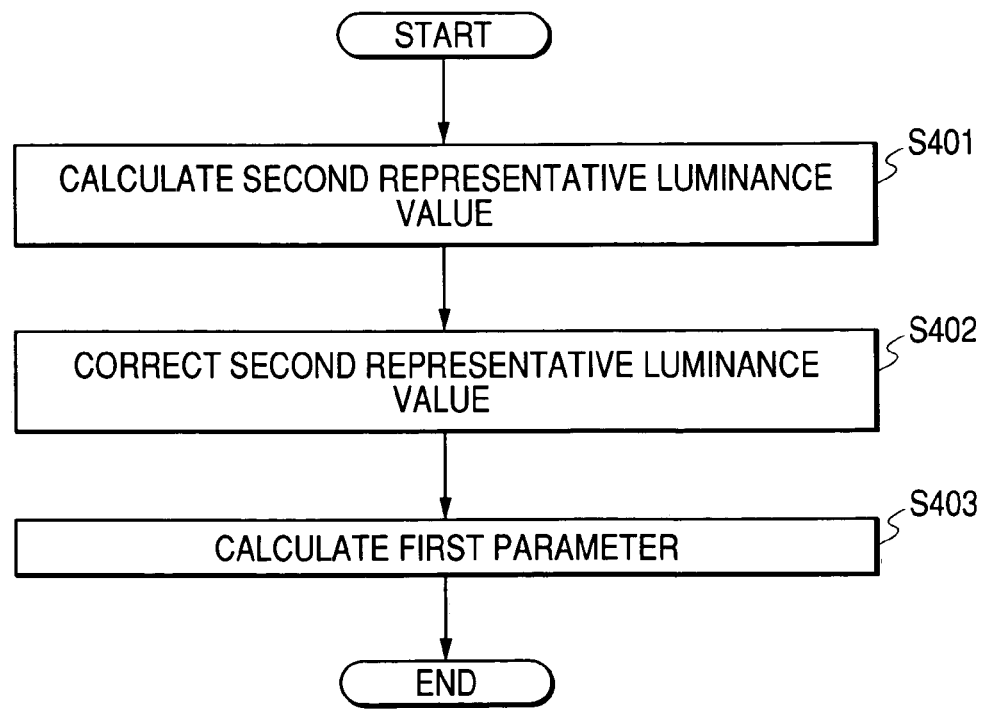
FIG. 4 is a flow chart explaining a process to be performed in a step S204.

FIG. 6 is a flow chart showing a second parameter calculation process according to the present embodiment. In FIG. 6, the parts same as those in the parameter calculation process (FIG. 4) of the first embodiment are denoted by the same symbols as those in FIG. 4, and the explanation thereof is omitted. In FIG. 6, a color correction process using a provisional parameter in a step S601 is provided before the second representative luminance value calculation in the step S401. Instead, the second representative luminance correction process in the step S402 of FIG. 4 is omitted.

In the step S601, the already-determined first parameter γ0 is used as it is, the second parameter γ1 is provisionally set to "0", and the color correction process is once performed. Here, the color correction process itself is the same as that in the first embodiment, and the explanation thereof is omitted. Incidentally, the equation adapted to the color correction process in the case where the second parameter γ1 is provisionally set to "0" is shown as the following equation (18).

$$Y'(x,y) = Y(x,y)^{\gamma 0} \quad (18)$$

The above color correction process using the provisional parameter need not be applied to the entire image, that is, this process only has to be applied only to the face area.

Moreover, because the color correction process is finally performed after the second parameter was determined, the pixel value obtained after the color correction using the provisional parameter was performed is not returned (written) to the original image. Therefore, a storage area different from the original image is provided, and the corrected pixel values and the calculated luminance values are stored in this storage area. Alternatively, these values may be stored as the luminance histogram. In that case, the second representative luminance value is calculated in the step S401 by referring to the luminance histogram formed in the step 601 instead of the pixel value or the luminance value. Besides, when the average luminance is used as the representative luminance, the sum total of the luminance values after the color correction process using the provisional parameter to the pixels in the area is calculated and the number of pixels in the area is counted beforehand in the step S601. Then, in the step S401, the average luminance value can be calculated from the sum total of the luminance values after the color correction process using the provisional parameter and the number of pixels in the area.

In the method of achieving the process according to the present embodiment, the provisional parameter is applied to the face area. Thus, it is possible to more appropriately calculate the second parameter, although the processing time is prolonged and the necessary memory capacity becomes large as compared with the first embodiment.

Third Embodiment

In the third embodiment, only the point different from the first and second embodiments will be explained.

In the first parameter calculation process of the first and second embodiments, the first parameter is calculated according to the luminance distribution of the first area. The present embodiment is different from the first and second embodiments in the point that the first parameter is calculated according to bibliographic information of the image data.

As the bibliographic information concerning an image, for example, in known Exif (Exchangeable image file format), camera information obtained at image photographing by a digital camera can be recorded in a tag format together with the image in question in the same file.

Incidentally, as the camera information concerning brightness at the time of image photographing, the camera information of Exif includes an aperture value tag, a shutter speed value tag and a brightness (luminance) value tag. That is, an aperture value (Av), a shutter speed (Tv) and a brightness (luminance) value (Bv) are described respectively in these tags in unit of APEX (Additive System of Photographic Exposure). In addition, although there is no definition in Exif version 2.2, if there is film speed (or film sensitivity) (Sv) information, an exposure amount (Ev) is calculated according to the following equation (19).

$$Ev = Av + Tv = Bv + Sv \qquad (19)$$

Therefore, for example, the exposure amount (Ev) is calculated from tag information concerning the aperture value (Av) and the shutter speed (Tv), and the first parameter is determined according to the calculated amount. More specifically, the first parameter is determined so as to darken the image when the exposure amount is small, while the first parameter is determined so as to brighten the image when the exposure amount is large. As explained in the first embodiment (FIG. 5), it is possible to previously define the correspondence between the exposure amount and the first parameter value (i.e., γ value) and then determine the above relation according to the exposure amount calculated from the defined correspondence calculating the exposure amount. Moreover, in a case where the film speed is described on a maker note tag or a user comment tag of Exif, it is possible to calculate the exposure amount together with the brightness (luminance) value tag information. Besides, in a case where the film speed is uniquely determined based on a model name of the digital camera, it is possible to obtain the film speed by referring to a model name tag and thus determine the first parameter. Moreover, it is possible to previously presume the film speed to be, e.g., ASA 100, determine the exposure amount based on the brightness (luminance) value tag information, and thus determine the first parameter. Moreover, another information such as ISOSpeedRatings being tag information of Exif may be used instead of the film speed.

In addition, as if a scene capture (photographing) type tag, it is possible to previously determine the first parameter with respect to each photographing scene type by using the information approximately corresponding to a mode of the camera at the photographing, and then applying the determined first parameter.

Incidentally, in such an Exif format, a subject area tag and a subject location tag are defined, whereby it is conceivable that these tags are used as the second area. When the information described in the subject area or the subject location does not represent the area but represents a point (dot) in the image, it only has to define the area on the basis of the point as the center by using a predetermined ratio with respect to the entire image or the predetermined number of pixels.

FIG. 7 is a flow chart showing the flow of the parameter determination process to be performed in the step S203 in the present embodiment. In this flow, the bibliographic information of the image is read in a step S701, and, as explained above, the first parameter is determined from the read bibliographic information in a step S702.

Moreover, because other various tags of Exif are defined, it is possible to use these tags. Besides, it is possible to configure a more complicated parameter determination logic by using the plural tags.

Besides, to use Exif for the bibliographic information of the image is merely exemplification. That is, it is of course possible to use other bibliographic information.

Moreover, in case of Exif, the bibliographic information is stored in the same file (image data file) as that in which the image data is stored. However, it is possible to store the bibliographic information in a file different from the image data file. In that case, the bibliographic information only has to be associated with the image data by some method. For example, when the bibliographic information and the image data are stored in the data storage unit 102, it is possible to set a part of the identifier (e.g., a file name or the like) of the bibliographic information file in common with a part of the identifier of the image data. Besides, it is possible to provide a known database so as to administrate such association. Moreover, as a modification, it is possible for the user to indicate the association. In that case, for example, it only has to display a list of image data files and bibliographic information files to the user so that the user can appropriately indicate both image and bibliographic information.

As explained above, in the image processing method according to the present embodiment, because the first parameter is determined based on the bibliographic information of the image, it is possible to simplify the first parameter determination process as compared with the first and second embodiments.

Fourth Embodiment

In the fourth embodiment, only the point different from the first to third embodiments will be explained.

That is, in the above first to third embodiments, the first parameter is automatically determined based on the correction-target image data or the bibliographic information data. However, the first parameter may be determined by user's designation.

In that case, a message to urge the user to input the first parameter is displayed on the display unit 103 in the step S203. Then, the user designates and sets the first parameter by appropriately operating the input unit 101. More specifically, it is possible for the user to input the first parameter by inputting specific numerical values or by designating it with use of a slider, a list box, a radio button or the like on a GUI (graphical user interface). Besides, instead of causing user to directly input the first parameter, for example, it is possible to provide two options "bright" and "dark", cause the user to select one of the options, and apply a predetermined parameter according to the result selected by the user.

As explained above, in the image processing method according to the present embodiment, because the first parameter is determined based on the user's input, for example, it is possible, by displaying the image processed result by this method on the display unit 103, to appropriately perform the image process in an interactive manner.

As many apparently widely different embodiments of the present invention can be made without departing from the spirit and scope thereof, that is, it is to be understood that the present invention is not limited to the specific embodiments thereof expect as defined in the appended claims.

What is claimed is:

1. An image processing method comprising:
    a brightness component extraction step of extracting a brightness component from image data;
    a low-frequency brightness component extraction step of extracting a low-frequency component signal of the brightness component as a low-frequency brightness component;
    a first parameter determination step of determining a first parameter;
    a second parameter determination step of determining a second parameter in accordance with a distribution of brightness component values in a second area in the image data; and
    a color adjustment step of performing color adjustment to the image data by using the brightness component, the low-frequency brightness component, the first parameter and the second parameter;
    wherein, in the color adjustment in said color adjustment step, pixel value conversion is performed based on a characteristic $A^C/B^D$, where the brightness component being an output of said brightness component extraction step is denoted as A, the distribution of the brightness component being an output of said low-frequency brightness component extraction step is denoted as B, the first parameter is denoted as C, and the second parameter is denoted as D.

2. An image processing method according to claim 1, wherein, in said first parameter determination step, the first parameter is determined in accordance with bibliographic information of an image.

3. An image processing method according to claim 1, wherein, in said first parameter determination step, the first parameter is determined in response to a user's instruction.

4. An image processing method according to claim 1, wherein, in said first parameter determination step, the first parameter is determined in accordance with a distribution of brightness component values in a first area in the image data.

5. An image processing method according to claim 4, wherein the first area is a larger area including the second area.

6. An image processing method according to claim 5, wherein the larger area including the second area corresponds to an entirety of an image represented by the image data.

7. An image processing method according to claim 5, wherein the first area is an area obtained by eliminating the second area from the larger area including the second area.

8. An image processing method according to claim 4, wherein said first parameter determination step includes:
    a first representative brightness component value calculation step of calculating a first representative brightness component value being representative of the first area in accordance with the distribution of the brightness component values in the first area in the image data; and
    a first parameter calculation step of calculating the first parameter from the first representative brightness component value.

9. An image processing method according to claim 1, wherein the second area is one or more areas including a person's face in an image represented by the image data.

10. An image processing method according to claim 1, wherein the second area is one or more areas including a person's skin in an image represented by the image data.

11. An image processing method according to claim 1, wherein the second area is an area determined by partial area information included in bibliographic information of an image represented by the image data.

12. An image processing method according to claim 1, wherein said second parameter determination step includes:
    a second representative brightness component value calculation step of calculating a second representative brightness component value being representative of the second area in accordance with the distribution of the brightness component values in the second area in the image data;
    a second representative brightness component value correction step of correcting the second representative brightness component value by estimating the second representative brightness component value and a change of the second representative brightness component value in a case where the color adjustment is performed by using the first parameter and a temporarily determined second parameter; and
    a second parameter calculation step of calculating the second parameter from the first parameter and the corrected second representative brightness component value.

13. An image processing method according to claim 1, wherein said second parameter determination step includes:
    a generation step of generating a temporarily color-adjusted image in which the color adjustment has been performed to an area of an image, represented by the image data, including the second area, by using the first parameter and a temporarily determined second parameter;
    a second representative brightness component value calculation step of calculating a second representative brightness component value from an area of the temporarily color-adjusted image corresponding to the second area; and
    a second parameter calculation step of calculating the second parameter from the first parameter and the second representative brightness component value.

14. An image processing method, comprising:
    a brightness component extraction step of extracting a brightness component from image data;
    a low-frequency brightness component extraction step of extracting a low-frequency component signal of the brightness component as a low-frequency brightness component;
    a first parameter determination step of determining a first parameter;
    a second parameter determination step of determining a second parameter in accordance with a distribution of brightness component values in a second area in the image data; and
    a color adjustment step of performing color adjustment to the image data by using the brightness component, the low-frequency brightness component, the first parameter and the second parameter,
    wherein the second area is an area determined by partial area information included in bibliographic information of an image represented by the image data, and
    wherein the bibliographic information of the image is bibliographic information defined by a known Exif, which is an Exchangeable image file format, and the partial area information is information described in a subject area tag or a subject position tag defined by Exif.

15. A recording medium on which is recorded a program instructing the performing of, by using a computer, an image processing method comprising:
- a brightness component extraction step of extracting a brightness component from image data;
- a low-frequency brightness component extraction step of extracting a low-frequency component signal of the brightness component as a low-frequency brightness component;
- a first parameter determination step of determining a first parameter;
- a second parameter determination step of determining a second parameter in accordance with a distribution of brightness component values in a second area in the image data; and
- a color adjustment step of performing color adjustment to the image data by using the brightness component, the low-frequency brightness component, the first parameter and the second parameter;
- wherein, in the color adjustment in said color adjustment step, pixel value conversion is performed based on a characteristic $A^C/B^D$, where the brightness component being an output of said brightness component extraction step is denoted as A, the distribution of the brightness component being an output of said low-frequency brightness component extraction step is denoted as B, the first parameter is denoted as C, and the second parameter is denoted as D.

16. An image processing apparatus comprising:
- a brightness component extraction unit configured to extract a brightness component from image data;
- a low-frequency brightness component extraction unit configured to extract a low-frequency component signal of the brightness component as a low-frequency brightness component;
- a first parameter determination unit configured to determine a first parameter;
- a second parameter determination unit configured to determine a second parameter in accordance with a distribution of brightness component values in a second area in the image data; and
- a color adjustment unit configured to perform color adjustment by using the brightness component, the low-frequency brightness component, the first parameter, and the second parameter;
- wherein, in the color adjustment by said color adjustment unit, pixel value conversion is performed based on a characteristic $A^C/B^D$, where the brightness component being an output of said brightness component extraction unit is denoted as A, the distribution of the brightness component being an output of said low-frequency brightness component extraction unit is denoted as B, the first parameter is denoted as C, and the second parameter is denoted as D.

17. A recording medium on which is recorded a program for instructing the performing of, by using a computer, an image processing method comprising:
- a brightness component extraction step of extracting a brightness component from image data;
- a low-frequency brightness component extraction step of extracting a low-frequency component signal of the brightness component as a low-frequency brightness component;
- a first parameter determination step of determining a first parameter;
- a second parameter determination step of determining a second parameter in accordance with a distribution of brightness component values in a second area in the image data; and
- a color adjustment step of performing color adjustment to the image data by using the brightness component, the low-frequency brightness component, the first parameter and the second parameter,
- wherein the second area is an area determined by partial area information included in bibliographic information of an image represented by the image data, and
- wherein the bibliographic information of the image is bibliographic information defined by a known Exif, which is an Exchangeable image file format, and the partial area information is information described in a subject area tag or a subject position tag defined by Exif.

18. An image processing apparatus comprising:
- a brightness component extraction unit configured to extract a brightness component from image data;
- a low-frequency brightness component extraction unit configured to extract a low-frequency component signal of the brightness component as a low-frequency brightness component;
- a first parameter determination unit configured to determine a first parameter;
- a second parameter determination unit configured to determine a second parameter in accordance with a distribution of brightness component values in a second area in the image data; and
- a color adjustment unit configured to perform color adjustment to the image data by using the brightness component, the low-frequency brightness component, the first parameter and the second parameter,
- wherein the second area is an area determined by partial area information included in bibliographic information of an image represented by the image data, and
- wherein the bibliographic information of the image is bibliographic information defined by a known Exif, which is an Exchangeable image file format, and the partial area information is information described in a subject area tag or a subject position tag defined by Exif.

* * * * *